United States Patent
Sakurai et al.

(10) Patent No.: US 7,345,838 B2
(45) Date of Patent: Mar. 18, 2008

(54) MAGNETIC RECORDING MEDIA AND MAGNETIC RECORDING AND REPRODUCING APPARATUS

(75) Inventors: Masatoshi Sakurai, Tokyo (JP); Akira Kikitsu, Yokohama (JP); Makoto Asakura, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 81 days.

(21) Appl. No.: 11/197,535

(22) Filed: Aug. 5, 2005

(65) Prior Publication Data
US 2006/0028750 A1    Feb. 9, 2006

(30) Foreign Application Priority Data
Aug. 6, 2004    (JP) .............................. 2004-230939

(51) Int. Cl.
*G11B 5/09*    (2006.01)
(52) U.S. Cl. ....................................................... 360/48
(58) Field of Classification Search ..................... None
See application file for complete search history.

(56) References Cited

U.S. PATENT DOCUMENTS

| | | | |
|---|---|---|---|
| 5,771,131 A | 6/1998 | Pirzadeh | |
| 5,943,180 A | 8/1999 | Seo et al. | |
| 6,153,281 A | 11/2000 | Meyer et al. | |
| 6,426,845 B1 * | 7/2002 | Sacks et al. | ............. 360/77.08 |
| 6,602,620 B1 | 8/2003 | Kikitsu et al. | |
| 6,641,935 B1 | 11/2003 | Li et al. | |
| 6,751,035 B1 | 6/2004 | Belser | |
| 6,753,043 B1 | 6/2004 | Kuo et al. | |
| 7,209,413 B2 * | 4/2007 | Van Der et al. | ......... 369/44.18 |
| 2003/0035973 A1 | 2/2003 | Trindade et al. | |
| 2004/0247945 A1 | 12/2004 | Chen et al. | |
| 2005/0117253 A1 * | 6/2005 | Moriya et al. | ............... 360/135 |
| 2005/0219730 A1 * | 10/2005 | Sakurai et al. | ................. 360/48 |
| 2006/0012913 A1 * | 1/2006 | Nakamura et al. | ....... 360/77.02 |
| 2006/0215306 A1 * | 9/2006 | Ehrlich et al. | ................. 360/75 |

FOREIGN PATENT DOCUMENTS

| | | |
|---|---|---|
| EP | 0339851 A2 | 11/1989 |
| JP | 62-232720 | 10/1987 |
| JP | 62-232720 A | 10/1987 |
| JP | 08-241512 | 9/1996 |
| JP | 09-97419 | 4/1997 |
| JP | 10-334460 | 12/1998 |
| JP | 11-161944 | 6/1999 |

OTHER PUBLICATIONS

Chinese Office Action dated Apr. 6, 2004 for Appln. No. 200510089412.8.
Singapore Search Report dated Apr. 18, 2007 for Appln. No. 200504953-1.

* cited by examiner

*Primary Examiner*—Andrea Wellington
*Assistant Examiner*—Dan I Davidson
(74) *Attorney, Agent, or Firm*—Pillsbury Winthrop Shaw Pittman, LLP

(57) ABSTRACT

The present invention relates to a magnetic recording media including servo zones having magnetic or nonmagnetic patterns which are utilized as servo signals including burst marks of a burst section adapted to detect off-track deviation, and data zones, in which the burst marks of the burst section in each of the servo zones are formed of an isolated nonmagnetic material surrounded by a magnetic material.

10 Claims, 6 Drawing Sheets

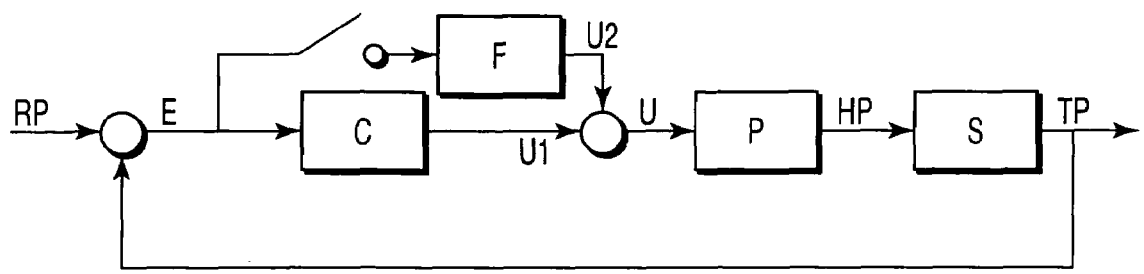
FIG. 7
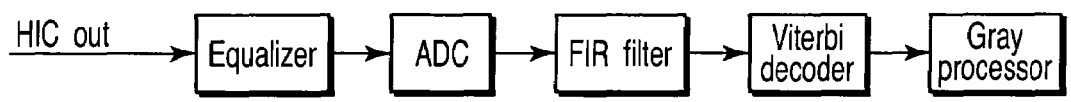
FIG. 8
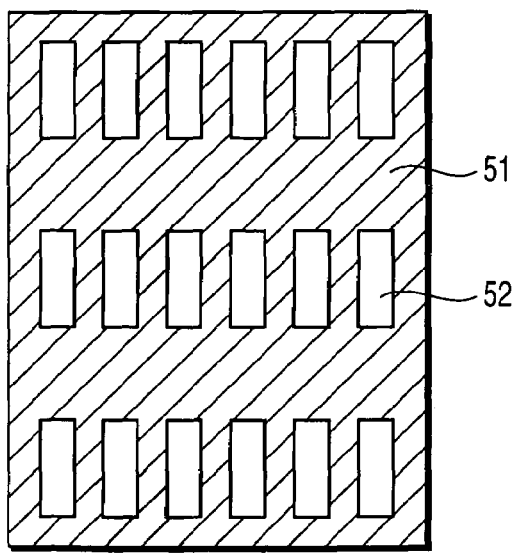 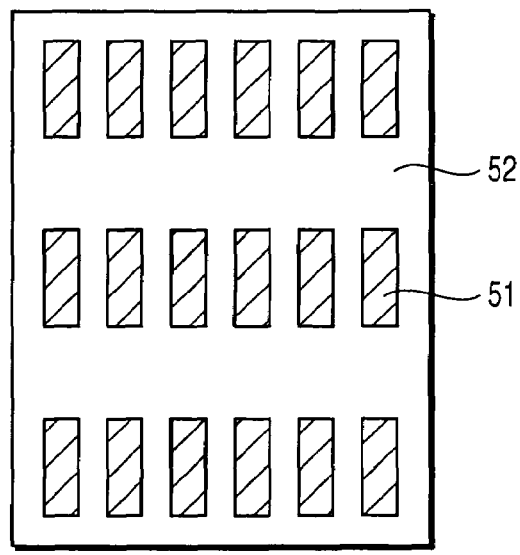
FIG. 9    FIG. 10

MAGNETIC RECORDING MEDIA AND MAGNETIC RECORDING AND REPRODUCING APPARATUS

CROSS-REFERENCE TO RELATED APPLICATIONS

This application is based upon and claims the benefit of priority from prior Japanese Patent Application No. 2004-230939, filed Aug. 6, 2004, the entire contents of which are incorporated herein by reference.

BACKGROUND OF THE INVENTION

1. Field of the Invention

The present invention relates to a patterned servo-type magnetic recording media and a magnetic recording and reproducing apparatus having the magnetic recording media.

2. Description of the Related Art

In recent years, in order to adapt to further high-density recording, much attention has been paid to a discrete track recording media in which adjacent recording tracks are separated from one another by guard bands consisting of a groove or a nonmagnetic material to suppress magnetic interference between the adjacent tracks. In manufacturing such a discrete track media, if both magnetic and nonmagnetic patterns defining recording tracks and magnetic and nonmagnetic patterns corresponding to signals in servo zones are formed by imprinting with a stamper, it makes possible to reduce costs, because such a method can eliminate servo track writing.

A magnetic disk has been proposed which has data recording zones in which grooves are formed along recording tracks, to which data is recorded, that are formed of protrusions between the grooves, and servo zones in which protrusions and recesses corresponding to servo signals are formed and magnetized so as to have opposite polarities, wherein the area of the protrusions is larger than that of the recesses in the servo zones (Jpn. Pat. Appln. KOKAI Publication No. 1999-161944).

The above conventional magnetic disk has a longitudinal recording layer deposited on a substrate on which protrusions and recesses are formed. A formatting operation must be performed after film deposition in order to magnetize the protrusions and recesses in the servo zones so as to have the opposite polarities. Further, a perpendicular recording layer cannot be readily used in such a magnetic disk, because it is difficult to magnetize the protrusions and recesses so as to have the opposite polarities. In this case, such a high-cost process that the whole media is subjected to DC demagnetization and then is reformatted with a write head is required, which makes the process disadvantageous.

On the other hand, if both magnetic patterns defining recording tracks and magnetic patterns corresponding to servo signals are formed by imprinting, the presence or absence of the magnetic material can be utilized as a servo signal. For such a magnetic disk, even when a perpendicular magnetic recording layer is formed, formatting is completed simply by DC demagnetization involving applying external fields at once. This is advantageous for increasing density while reducing costs.

However, it has recently been found that the thermal stability of recorded magnetization may be degraded in such a discrete track-type magnetic disk.

BRIEF SUMMARY OF THE INVENTION

A magnetic recording media according to an aspect of the present invention comprises: servo zones comprising magnetic or nonmagnetic patterns which are utilized as servo signals including burst marks of a burst section adapted to detect off-track deviation; and data zones, the burst marks of the burst section in each of the servo zones being formed of an isolated nonmagnetic material surrounded by a magnetic material. The magnetic recording media may comprise the data zones comprising recording tracks formed of a magnetic pattern and guard bands formed of a nonmagnetic pattern separating the recording tracks, in addition to the patterned servo zones.

A magnetic recording apparatus according to another aspect of the present invention comprises: a magnetic recording media comprising servo zones comprising magnetic or nonmagnetic patterns which are utilized as servo signals including burst marks of a burst section adapted to detect off-track deviation, and data zones, the burst marks of the burst section in each of the servo zones being formed of an isolated nonmagnetic material surrounded by a magnetic material, and a magnetic head positioned above the magnetic recording media.

BRIEF DESCRIPTION OF THE SEVERAL VIEWS OF THE DRAWING

FIG. 7 is a block diagram showing a control mechanism for head positioning for an magnetic recording and reproducing apparatus according to an embodiment of the present invention;

FIG. 8 is a block diagram showing an address processing unit in a channel in a magnetic recording and reproducing apparatus according to an embodiment of the present invention;

FIG. 9 is a plan view showing a burst section in a servo zone in a discrete track media according to an example of the present invention;

FIG. 10 is a plan view showing a burst section in a servo zone in a discrete track media according to a comparative example of the present invention;

DETAILED DESCRIPTION OF THE INVENTION

A magnetic disk according to an embodiment of the present invention will be described with reference to FIGS. 1 to 4.

Figure 1:
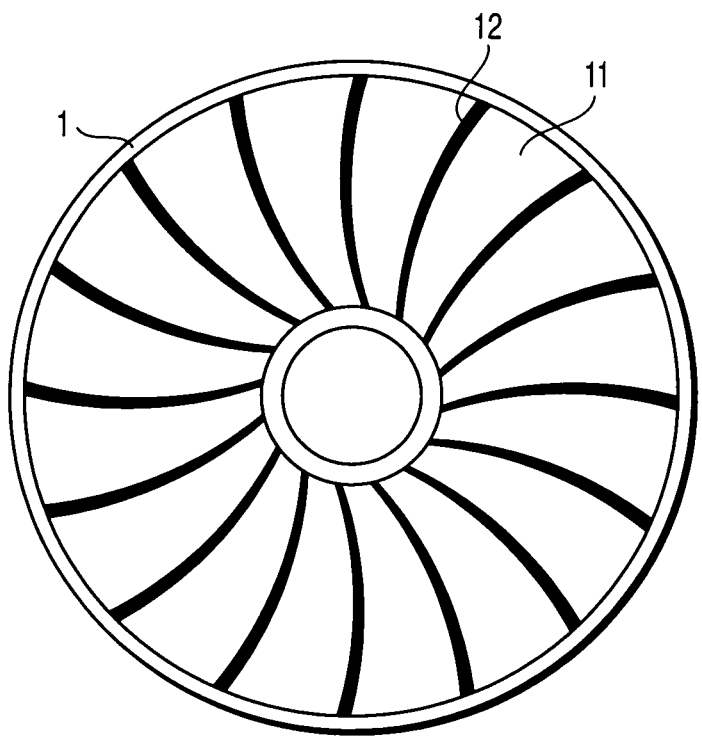
FIG. 1 is a schematic plan view of a magnetic disk according to an embodiment of the present invention.

FIG. 1 is a schematic plan view of a magnetic disk 1 according to an embodiment of the present invention. FIG. 1 shows data zones 11 and servo zones 12. User data is recorded in each of the data zones 11. This magnetic disk is a so-called DTR (discrete track recording) media having discrete tracks formed of concentric magnetic patterns. The recording tracks will be described later with reference to FIG. 2. The disk has a diameter of 20.6 mm. The radial position of the innermost recording track is 4.7 mm, while the radial position of the outermost recording track is 9.7 mm. Servo data for head positioning is formed in each of the servo zones 12 as patterns of a magnetic material and a nonmagnetic material. On the disk surface, the servo zone 12 is shaped like a circular arc corresponding to a locus of a head slider during access. The servo zone 12 is formed so that its circumferential length is larger as its radial position is closer to its outermost periphery.

Figure 2:
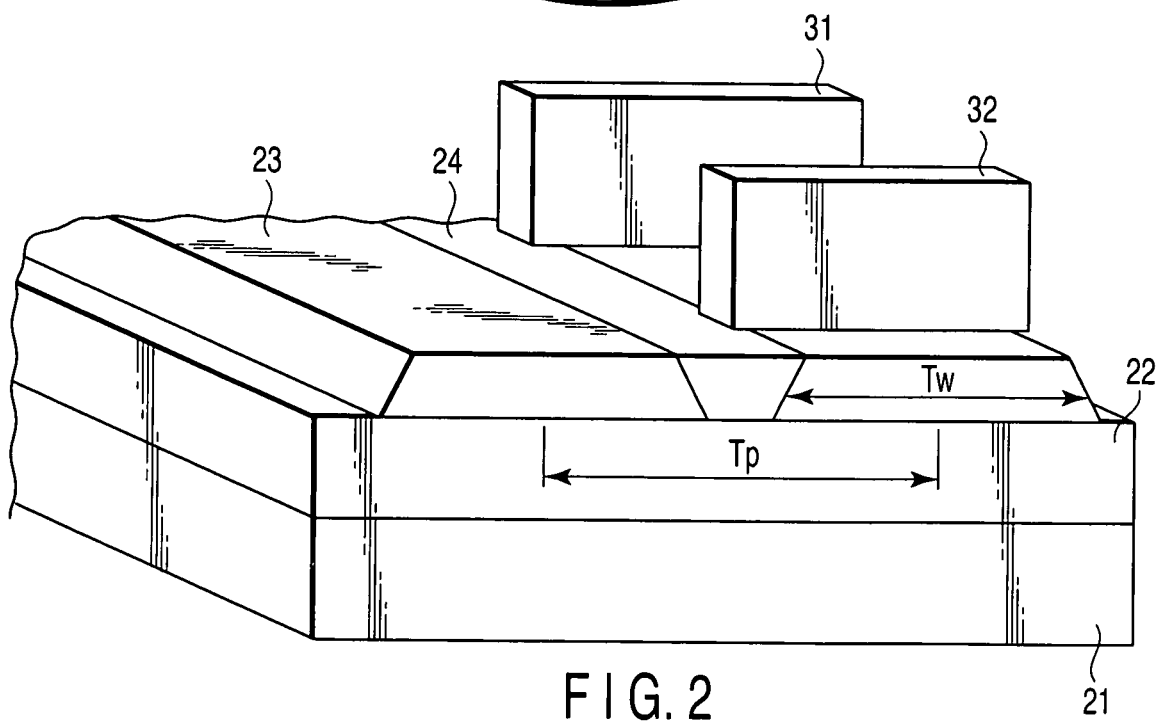
FIG. 2 is a perspective view showing a data zone in a magnetic disk according to an embodiment of the present invention.

FIG. 2 is a perspective view of a data zone in a magnetic disk according to an embodiment of the present invention. A soft underlayer 22 is formed on a substrate 21. Magnetic patterns constituting the recording tracks 23 and guard bands 24 made of a nonmagnetic material are alternately formed along a radial direction, and thus the recording tracks 23 are separated by the guard bands 24. The radial width and track pitch of the recording track 23 are denoted as Tw and Tp, respectively. The radial width Tw is formed to be larger than the width of the guard band 24. In the present embodiment, the ratio of the magnetic material to the nonmagnetic material in the radial direction is 2:1, that is, the occupancy rate of the magnetic material is set to 67%. A giant magntoresistive (GMR) element 31 of a read head and a single pole 32 of a write head, which are formed in the head slider, are positioned above the recording track 23.

As the substrate 21, a flat glass substrate is used. The substrate 21 is not limited to the glass substrate but an aluminum substrate may be used. As a ferromagnetic material forming the recording track 23, CoCrPt is used. As a nonmagnetic material forming the guard band 24, $SiO_2$ is used. $SiO_2$ is filled into the grooves between the recording tracks 23 and then $SiO_2$ is flattened, thereby forming the guard bands 24. Although not shown, a protective film of diamond-like carbon (DLC) is formed on the surfaces of the recording tracks 23 and guard bands 24. Lubricant is then applied to the surface of the protective film. In another embodiment of the present invention, the protective film may be formed directly on protruded and recessed surfaces of the recording tracks 23 without filling the $SiO_2$ into the grooves between the recording tracks 23.

Figure 3:
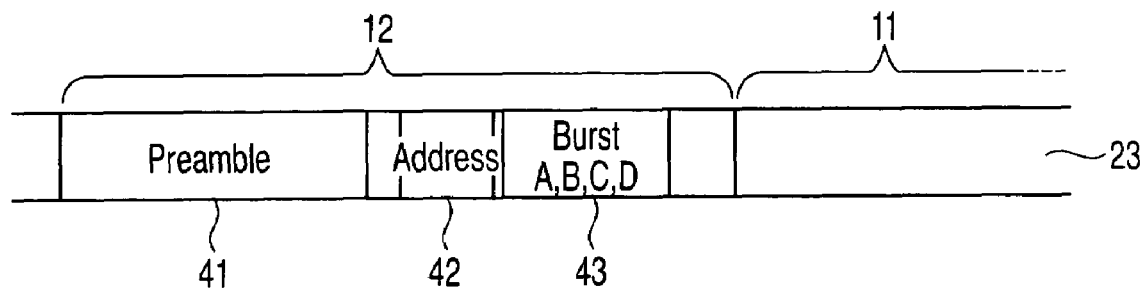
FIG. 3 is a schematic diagram showing a servo zone and a data zone in a magnetic disk according to an embodiment of the present invention.
Figure 4:
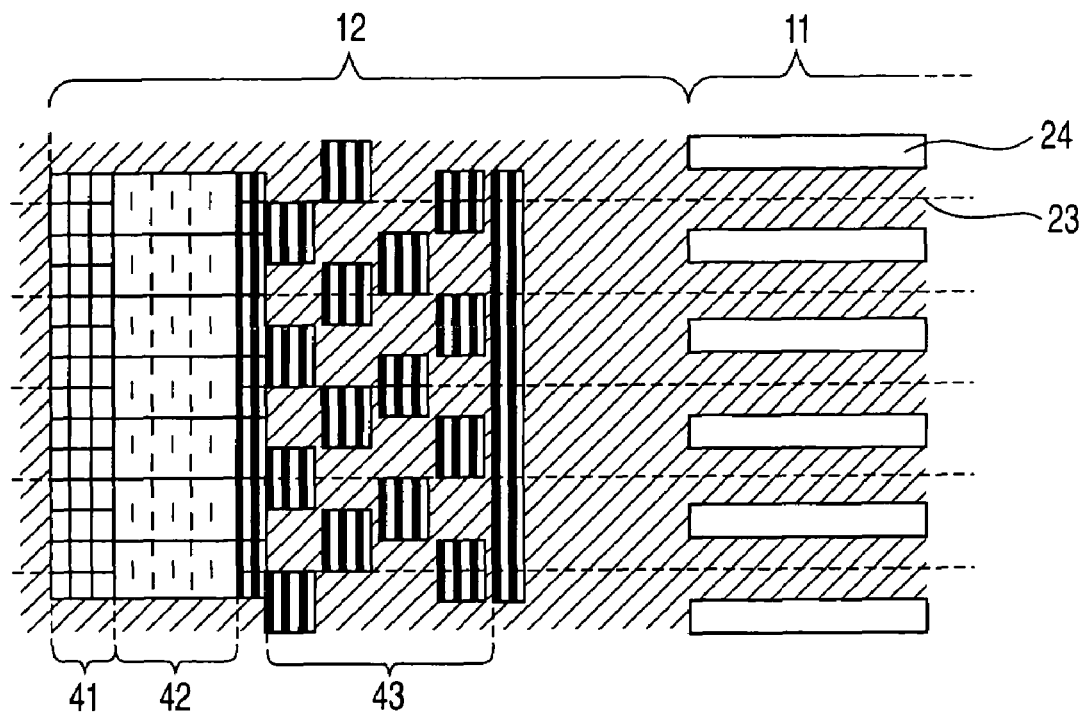
FIG. 4 is a plan view showing patterns in a servo zone and a data zone in a magnetic disk according to an embodiment of the present invention.

With reference to FIGS. 3 and 4, the patterns of the servo zone and data zone will be described. As schematically shown in FIG. 3, the servo zone 12 includes a preamble section 41, an address section 42, and a burst section 43 for detecting deviation.

As shown in FIG. 4, the data zone 11 includes the recording tracks 23 formed of magnetic patterns, and the guard bands 24 made of a nonmagnetic material. Patterns of the magnetic and nonmagnetic materials which provide servo signals are formed in each of the preamble section 41, address section 42, and burst section 43 in the servo zone 12. These sections have the functions described below.

The preamble section 41 is provided to execute a PLL process for synthesizing a clock for a servo signal read relative to deviation caused by rotational deflection of the media, and an AGC process for maintaining appropriate signal amplitude. The preamble section 41 has patterns of the magnetic and nonmagnetic materials substantially constituting circular arcs without being separated in the radial direction and repeatedly formed in the circumferential direction. The area ratio of the magnetic material to nonmagnetic material in the preamble section 41 is approximately 1:1, that is, the occupancy rate of the magnetic material is approximately 50%.

The address section 42 has servo signal recognition codes called servo marks, sector data, cylinder data, and the like formed at the same pitch as that of the preamble section 41 in the circumferential direction using Manchester encoding. In particular, since the cylinder data has a pattern exhibiting a data varied for every servo track, it is recorded using Manchester encoding after being converted into Gray codes providing the minimum difference between adjacent tracks so as to reduce the adverse effect of address reading errors during a seek operation. Also in the address section 42, the occupancy rate of the magnetic material is approximately 50%.

The burst section 43 is an off-track detecting section used to detect the amount of off-track with respect to the on-track state for a cylinder address. The burst section 43 has four fields of burst marks (called an A, B, C, and D bursts), whose pattern phases in a radial direction are shifted to each other in respective fields. Plural marks are arranged at the same pitch as that of the preamble section in the circumferential direction. The radial period of each burst is proportional to the period at which the address pattern changes, in other words, the servo track period. According to the present embodiment, respective bursts are formed in a length of 10 periods in the circumferential direction. The bursts are repeated in the radial direction in a period twice as long as the servo track period. In the burst section 43, the occupancy rate of the magnetic material is approximately 75%.

According to an embodiment of the present invention, each of the burst marks is formed of an isolated nonmagnetic material surrounded by a magnetic material. Each burst mark is designed to be a rectangle, or more precisely, a parallelogram taking the skew angle during head access into account. The mark may be slightly rounded depending on precision in stamper processing or processing performance for transfer formation and the like. The principle of detection of a position on the basis of the burst section 43 will not be described in detail. The off-track amount is obtained by calculating the average amplitude value of read signals from the A, B, C, and D bursts.

A process for manufacturing a magnetic disk according to an embodiment of the present invention will be briefly described. The steps of manufacturing a magnetic disk include a transfer step, a magnetic material processing step, and a finishing step.

Before describing these steps, a method of manufacturing a stamper used for the transfer step will be described. The process of manufacturing the stamper is subdivided into drawing, development, electroplating, and finishing. In the pattern drawing, an electron beam resist is applied to a master plate. An electron beam drawing apparatus with master plate rotation is used to draw patterns corresponding to the nonmagnetic sections of the magnetic disk from the inner periphery to the outer periphery. The electron beam resist is developed. Then, the master plate is processed by RIE or the like to form a master plate with protruded and recessed patterns. The surface of the master plate is made conductive by depositing a Ni thin film. The master plate is subjected to Ni electroplating. Then, the electroplated film is stripped. The back surface of the electroplated film is polished to adjust film thickness and to flatten the film. Finally, the inner and outer diameters of the film are punched out to produce a disk-shaped Ni stamper. In the stamper, protruded portions correspond to the nonmagnetic portions in the magnetic disk.

In the transfer step, an imprinting apparatus of double-sided co-transfer type is used to carry out imprinting lithography. Specifically, a soft underlayer and a perpendicular recording layer are deposited on each side of the disk substrate, and then an SOG (spin-on-glass) resist is applied to each side. The disk substrate is sandwiched between two stampers for the back and front surfaces. They are uniformly pushed to transfer the protruded and recessed patterns of the stamper to the resist surface. The recesses in the resist formed during the transfer step correspond to the nonmagnetic portions in the magnetic disk.

In the magnetic material processing step, the resist residue at the bottom of each recess is removed to expose the surface of the magnetic material. In this stage, $SiO_2$ remains on portions where the magnetic material is to be left. This $SiO_2$ is used as a mask to etch the exposed magnetic material by ion milling to form desired magnetic patterns. An $SiO_2$ film of a sufficient thickness is deposited by sputtering. Then, the $SiO_2$ film is reverse-sputtered to the surface of the magnetic layer to flatten the recesses between the magnetic patterns with the filled nonmagnetic material.

In the finishing step, the surface of the disk is polished, and then a DLC protective layer is formed. Further, a lubricant is applied to the protective layer. A magnetic disk according to the embodiment of the present invention is manufactured by these steps.

Figure 5:
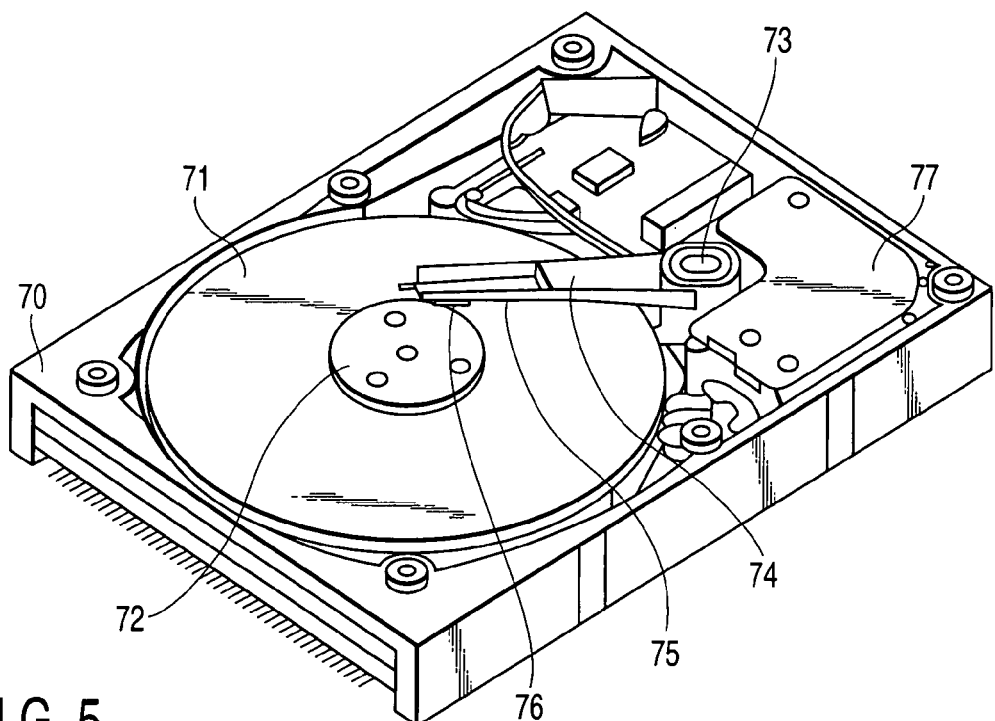
FIG. 5 is a perspective view of a magnetic recording and reproducing apparatus according to an embodiment of the present invention.

FIG. 5 is a perspective view of a magnetic recording and reproducing apparatus (hard disk drive) according to an embodiment of the present invention. The magnetic recording and reproducing apparatus comprises, inside a chassis 70, a magnetic disk 71, a head slider 76 including a read head and a write head, a head suspension assembly (a suspension 75 and an actuator arm 74) that supports the head slider 76, a voice coil motor (VCM) 77 and a circuit board.

The magnetic disk (discrete track media) 71 is mounted on and rotated by a spindle motor 72. Various digital data are recorded on the magnetic disk 71 in perpendicular magnetic recording manner. The magnetic head incorporated in the head slider 76 is a so-called integrated head including a write head of a single pole structure and a read head using a shielded MR read element (such as a GMR film or a TMR film). The suspension 75 is held at one end of the actuator arm 74 to support the head slider 76 so as to face the recording surface of the magnetic disk 71. The actuator arm 74 is attached to a pivot 73. The voice coil motor (VCM) 77, which serves as an actuator, is provided at the other end of the actuator 74. The voice coil motor (VCM) 77 drives the head suspension assembly to position the magnetic head at an arbitrary radial position of the magnetic disk 71. The circuit board comprises a head IC to generate driving signals for the voice coil motor (VCM) and control signals for controlling read and write operations performed by the magnetic head.

Figure 6:
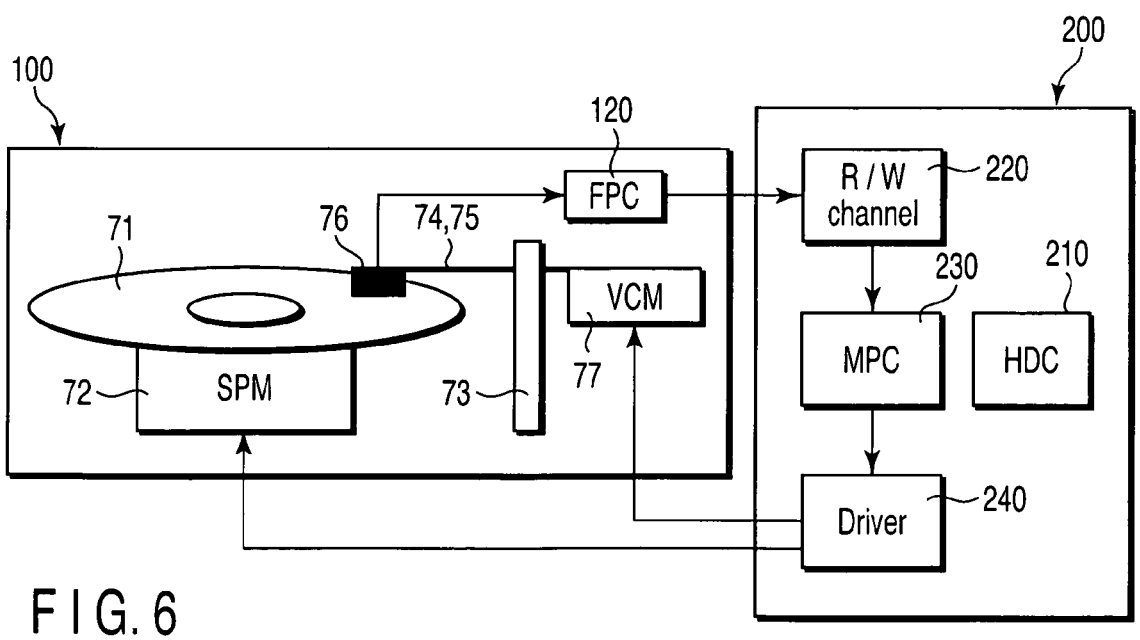
FIG. 6 is a block diagram of a magnetic recording and reproducing apparatus according to an embodiment of the present invention.

FIG. 6 shows a block diagram of the magnetic recording and reproducing apparatus (hard disk drive) according to an embodiment of the present invention. This figure shows the head slider only above the top surface of the magnetic disk. However, the perpendicular magnetic recording layer with discrete tracks is formed on each side of the magnetic disk as described above. A down head and an up head are provided above the bottom and top surfaces of the magnetic disk, respectively.

The disk drive includes a main body unit called a head disk assembly (HDA) 100 and a printed circuit board (PCB) 200.

As shown in FIG. 6, the head disk assembly (HDA) 100 has the magnetic disk (discrete track media) 71, the spindle motor 72, which rotates the magnetic disk, the head slider 76, including the read head and the write head, the suspension 75 and actuator arm 74, the voice coil motor (VCM) 77, and a head amplifier (HIC), which is not shown. The head slider 76 is provided with the read head including the GMR element 31 and the write head including the single pole 32, which are shown in FIG. 2.

The head slider 76 is elastically supported by a gimbal provided on the suspension 75. The suspension 75 is attached to the actuator arm 74, which is rotatably attached to the pivot 73. The voice coil motor (VCM) 77 generates a torque around the pivot 73 for the actuator arm 74 to move the head in the radial direction of the magnetic disk 71. The head amplifier (HIC) is fixed to the actuator arm 74 to amplify input signals to and output signals from the head. The head amplifier (HIC) is connected to the printed circuit board (PCB) 200 via a flexible print cable (FPC) 120. Providing the head amplifier (HIC) on the actuator arm 74 enables to reduce noise in the head signals effectively. However, the head amplifier (HIC) may be fixed to the HDA main body.

As described above, the perpendicular magnetic recording layer is formed on each side of the magnetic disk 71, and the servo zones each shaped like a circular arc are formed so as to correspond to the locus of the moving head. The specifications of the magnetic disk meet outer and inner diameters and read/write characteristics adapted to a particular drive. The radius of the circular arc formed by the servo zone is given as the distance from the pivot to the magnet head element.

Four major system LSIs are mounted on the printed circuit board (PCB) 200. The system LSIs are a disk controller (HDC) 210, a read/write channel IC 220, a MPU 230, and a motor driver IC 240.

The MPU 230 is a control unit of a driving system and includes ROM, RAM, CPU, and a logic processing unit which implement a head positioning control system according to the present embodiment. The logic processing unit is an arithmetic processing unit composed of a hardware circuit to execute high-speed calculations. Firmware (FW) for the logic processing circuit is saved to the ROM. The MPU controls the drive in accordance with FW.

The disk controller (HDC) 210 is an interface unit in the hard disk drive which manages the whole drive by exchanging information with interfaces between the disk drive and a host system (for example, a personal computer) and with the MPU, read/write channel IC, and motor driver IC.

The read/write channel IC 220 is a head signal processing unit relating to read/write operations. The read/write channel IC 220 is composed of a circuit which switches the channels of the head amplifier (HIC) and which processes read/write signals in read/write operations.

The motor driver IC 240 is a driver unit for the voice coil motor (VCM) 77 and spindle motor 72. The motor driver IC 240 controls the spindle motor 72 so that the motor 72 can rotate at a constant speed and provides a current, which is determined based on a VCM manipulating variable from the MPU 230, to VCM 77 to drive the head moving mechanism.

A control mechanism for head positioning will be described with reference to FIG. 7. This figure is a block diagram showing head positioning. The symbols C, F, P, and S mean system transfer functions. The control target P specifically corresponds to head moving means including VCM. The signal processing unit S is specifically implemented by the read/write channel IC and MPU (executing a part of off-track detection processing).

The control processing unit is composed of a feedback control unit C (first controller) and a synchronism compensating unit F (second controller). The control processing unit is specifically implemented by MPU.

Operations of the signal processing unit S will be described later in detail. The signal processing unit S generates information on the current track position (TP) on the disk on the basis of read signals from a servo zone on the disk immediately below the head position (HP).

On the basis of the positional deviation (E) between a target track position (RP) on the disk and the current position (TP) of the head on the disk, the first controller outputs a FB operation value U1 that reduces the positional deviation.

The second controller is a FF compensating unit that compensates for the shapes of the tracks on the disk and vibration that occurs in synchronism with the rotation of the disk. The second controller saves pre-calibrated rotation synchronization compensating values to a memory table. The second controller normally makes reference to the table on the basis of servo sector information (not shown) provided by the signal processing unit S to output an FF operation value U2 without use of positional deviation (E).

The control processing unit adds the outputs U1 and U2 of the first and second controllers to supply a control operation value U to VCM 77 via the disk controller (HDC) 210 to drive the head.

The synchronization compensating value table is calibrated during an initializing operation. When the positional deviation (E) becomes equal to or larger than a set value, a re-calibrating process is started to update the synchronization compensating value.

A method for detecting a positional deviation from read signals of a servo zone will be briefly described. The magnetic disk is rotated by the spindle motor at a constant rotation speed. The head slider is designed to be elastically supported by the gimbal provided on the suspension and to retain a very small flying height balancing with air pressure resulting from the rotation of the magnetic disk. Thus, the GMR element, included in the read head, detects a leakage flux from the recording layer of the magnetic disk across a predetermined magnetic spacing. The rotation of the magnetic disk causes each servo zone in the magnetic disk to pass immediately below the head at a constant period. A servo process can be executed by detecting track position information on the basis of read signals from the servo zone.

Upon finding an identification flag for the servo zone called a servo mark, the disk controller (HDC) can predict timing when the servo zone passes immediately below the head on the basis of the periodicity of the servo zone. Thus, the disk controller (HDC) causes the channel to start a servo process at a time when the preamble section will pass immediately below the head.

With reference to the block diagram in FIG. 8, an address reproducing process in the channel will be described. Read output signals from the head amplifier IC (HIC) are loaded into the channel IC and subjected to an analog filtering process (longitudinal signal equalizing process) by an equalizer, and then sampled as digital values by an analog-to-digital converter (ADC).

A leakage flux from the magnetic disk according to the present embodiment is a perpendicular field corresponding to the magnetic patterns. However, all DC offset components are removed from the leakage flux by high-pass characteristics of the head amplifier (HIC) and the longitudinal equalizing process by the equalizer in the earlier stage of the channel IC. As a result, an output signal from the preamble section after the analog filtering process becomes an almost pseudo sine wave. The only difference from the signal obtained from the conventional perpendicular magnetic recording media is that the signal amplitude is reduced by half.

In the case where the polarity of the head is set inappropriately, the bit 1 or 0 may be mistakenly recognized depending on the direction of the leakage flux from the servo zone, causing the channel to fail in code detection, which is applied to not only the discrete track media according to the present embodiment but also another media. Accordingly, the polarity of the head must be appropriately set in accordance with the patterned leakage flux.

The channel IC switches the process in accordance with read signal phases. Specifically, the channel IC executes, for example, a process of pulling into synchronism of synchronizing a read signal clock with a media pattern period, an address reading process of reading sector and cylinder data, and a burst process for detecting the off-track amount.

The process of pulling into synchronism will be described briefly. In this process, a process of synchronizing timing for ADC sampling with sinusoidal read signals and an AGC process of matching the signal amplitude of digital sampling values at a certain level are executed. The periods of the bits 1 and 0 of the media pattern are sampled at four points.

In the address reading process, the sampling values are subjected to noise reduction in FIR, and then converted into sector and track data by the Viterbi decoding process, based on maximum likelihood estimation, or the Gray code inverse transformation process. This makes it possible to acquire servo track information of the head.

Then, the channel shifts to the process of detecting the off-track amount in the burst section. This process is not illustrated but proceeds as follows. Signal amplitudes are subjected to sample-hold integration in the order of the burst signal patterns A, B, C, and D. A voltage value corresponding to the average amplitude is output to MPU. A servo process interruption is then issued to MPU. Upon receiving the interruption, MPU uses the internal ADC to load the burst signals in a time series manner. DSP then converts the signals into an off-track amount. The servo track position of the head is precisely detected on the basis of the off-track amount and the servo track information.

EXAMPLE AND COMPARATIVE EXAMPLE

FIG. 9 is a plan view showing a burst section in a servo zone in discrete track media according to an example of the present invention. In the present example, each burst mark is formed of an isolated nonmagnetic material 52 surrounded by a magnetic material 51.

FIG. 10 is a plan view showing a burst section in a servo zone in discrete track media according to a comparative example. In the comparative example, each burst mark is formed of an isolated magnetic material 51 surrounded by a nonmagnetic material 52.

Figure 11:
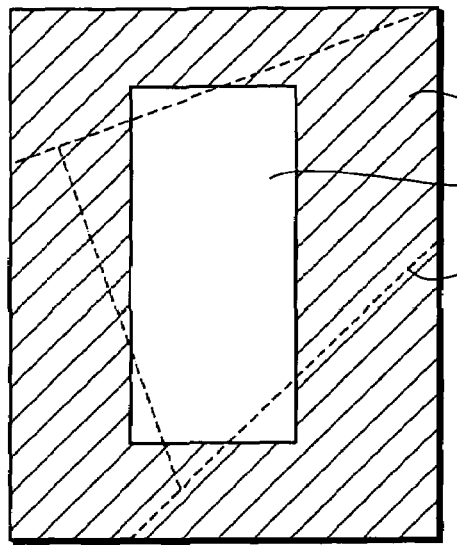
FIG. 11 is a schematic view showing grain boundaries generated in a magnetic material surrounding the burst mark shown in FIG. 9.
Figure 12:
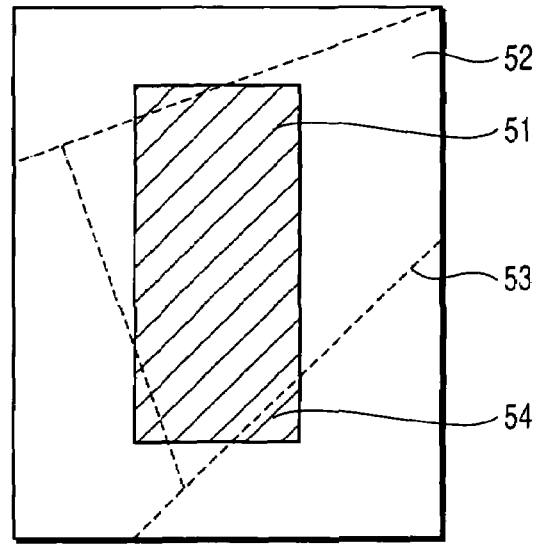
FIG. 12 is a schematic view showing grain boundaries generated in a magnetic material forming the burst mark shown in FIG. 10.

FIG. 11 shows grain boundaries 53 generated in the magnetic material 51 surrounding the burst mark shown in FIG. 9 (example). FIG. 12 shows grain boundaries 53 generated in the magnetic material 51 forming the burst mark shown in FIG. 10 (comparative example). The grain boundaries 53 are linearly generated at random positions in the magnetic material 51 during deposition of the magnetic material. The grain boundaries 53 thus generated work as barriers to separate the magnetic material 51 into fine grains of the magnetic material. The discrete track media involves a step of patterning the magnetic material, so that the magnetic material 51 may be processed so as to partly remove the linear grain boundaries 53. Consequently, the fine grains, into which the magnetic material has been separated by the grain boundaries 53, are further divided by processing cross sections.

As shown in FIG. 12 (comparative example), if the burst mark is formed of the isolated magnetic material 51, a very small magnetic region 54 may occur in the burst mark. The very small magnetic region 54 has such a small volume as to make the magnetization after recording thermally unstable, possibly causing media noise. In particular, in an inner peripheral portion of the disk where burst marks are densely formed, many fine magnetic regions 54 occur in the burst marks.

Figure 13:
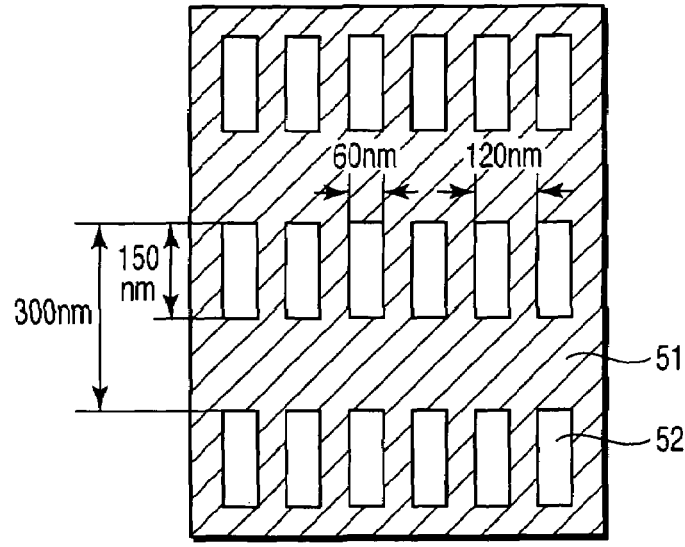
FIG. 13 is a plan view showing burst marks on the innermost periphery of a discrete track media according to an embodiment of the present invention.

For example, FIG. 13 shows burst marks in the innermost periphery of a discrete track media according to an embodiment of the present invention. As shown in this figure, the size of each burst mark in the innermost periphery is about 60 nm (at a pitch of about 120 nm) in a track direction and about 150 nm (at a pitch of about 300 nm) in a cross-track direction.

When such a fine burst mark is formed of a magnetic material and divided into pieces by grain boundaries and processing cross sections, there is high probability of forming fine magnetic regions 54 of size of 10 nm or less. Consequently, media noise is very prone to occur.

On the other hand, if the burst mark is formed of the isolated nonmagnetic material 52 surrounded by the magnetic material 51 as shown in FIG. 11 (example), fine magnetic regions which are thermally unstable are unlikely to occur even if the magnetic material 51 is divided into pieces by grain boundaries and processing cross sections. Consequently, media noise is suppressed.

Figure 14:
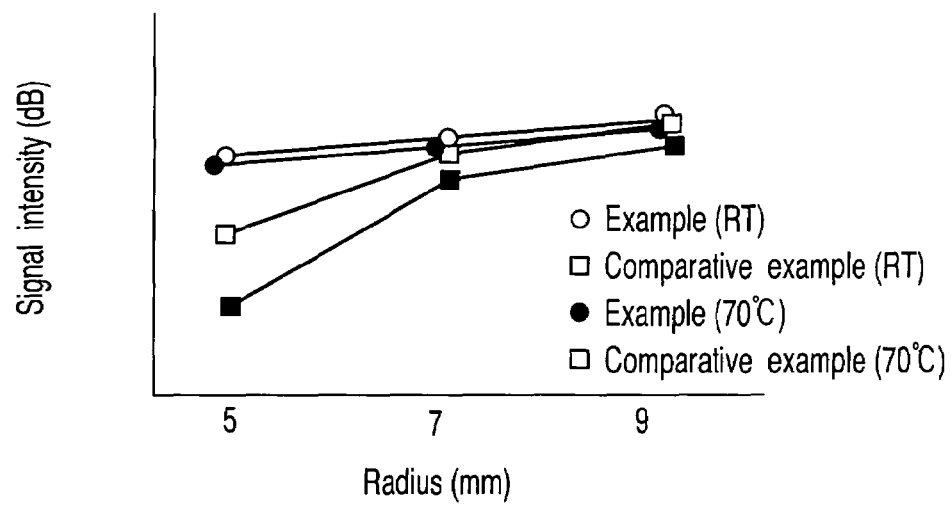
FIG. 14 is a diagram showing measurements of SNR in an inner peripheral portion, an intermediate portion, and an outer peripheral portion at room temperature and at 70° C., in the magnetic recording apparatuses according to the example and the comparative example.

Magnetic recording apparatuses are produced; one of them uses a discrete track media having nonmagnetic burst marks according to the example, and the other uses a discrete track media having magnetic burst marks according to the comparative example. For these magnetic recording apparatuses, signal-to-noise ratio (SNR) is measured in an inner peripheral portion, an intermediate portion, and an outer peripheral portion at room temperature and at 70° C. FIG. 14 shows the measurement results.

As shown in FIG. 14, for the apparatus according to the comparative example, the SNR decreases more markedly in the inner peripheral portion than in the outer peripheral and intermediate portions at room temperature. Further, at 70° C., the SNR decreases more markedly in the inner peripheral portion. A decrease in SNR is also observed in the intermediate portion. In contrast, for the apparatus according to the example, signal intensity did not vary significantly depending on the radial position either at room temperature or at 70° C.

Figure 15:
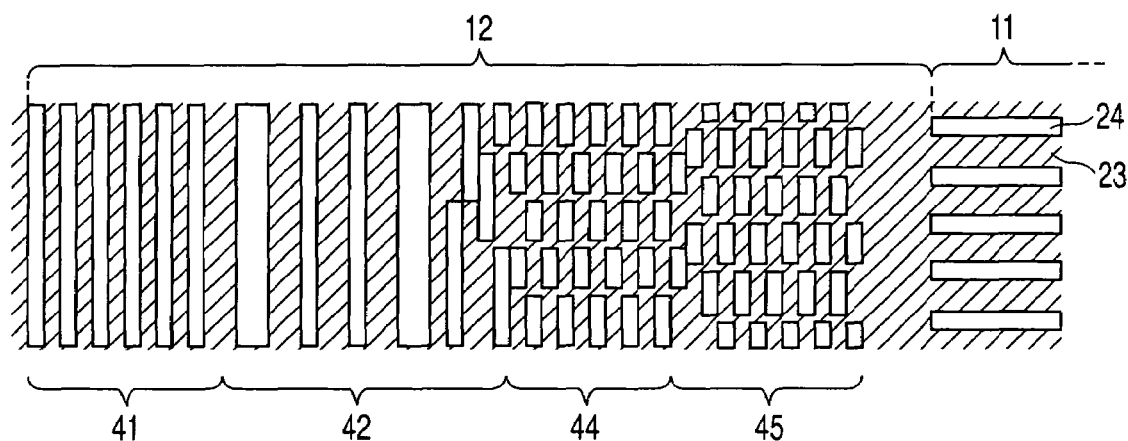
FIG. 15 is a plan view showing patterns in a servo zone and a data zone in a magnetic disk according to another embodiment of the present invention.

In the above description, the burst marks in the ABCD burst section 43, shown in FIG. 4, are each formed of the isolated nonmagnetic material. However, the present invention is similarly applicable to a null burst section. FIG. 15 shows a servo zone and a data zone in a magnetic disk having a null burst section.

Though the ABCD burst section 43 is formed as one section in FIG. 4, the null burst section is divided into a first burst section (AB) 45 and a second burst section (CD) 46. Even in the case of the first burst section 45 and second burst section 46, shown in FIG. 15, recorded magnetization can be thermally stabilized by forming each burst mark using an isolated nonmagnetic material and placing a magnetic material around the nonmagnetic material.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A magnetic recording media comprising:
servo zones comprising magnetic or nonmagnetic patterns which are utilized as servo signals including burst marks of a burst section adapted to detect off-track deviation; and
data zones,
wherein the burst section is a null burst section, and the burst marks of the null burst section in each of the servo zones are formed of an isolated nonmagnetic material that is surrounded by a magnetic material by placing the magnetic material around the nonmagnetic material such that the magnetic material is not divided at the four corners of the nonmagnetic material.

2. The magnetic recording media according to claim 1, wherein the data zones comprise recording tracks formed of a magnetic pattern and guard bands formed of a nonmagnetic pattern separating the recording tracks.

3. The magnetic recording media according to claim 1, wherein the data zones comprise a soft underlayer and magnetic patterns made of a perpendicular magnetic recording layer formed on the soft underlayer.

4. The magnetic recording media according to claim 1, wherein an innermost recording track is located at a radial position at most 5 mm away from a media center.

5. A magnetic recording apparatus comprising:
a magnetic recording media comprising servo zones that include magnetic or nonmagnetic patterns which are utilized as servo signals including burst marks of a burst section adapted to detect off-track deviation, and data zones, in which the burst section is a null burst section, and the burst marks of the null burst section in each of the null servo zones are formed of an isolated nonmagnetic material that is surrounded by a magnetic material by placing the magnetic material around the nonmagnetic material such that the magnetic material is not divided at the four corners of the nonmagnetic material; and a magnetic head positioned above the magnetic recording media.

6. The magnetic recording apparatus according to claim 5, wherein the data zones comprise recording tracks formed of a magnetic pattern and guard bands formed of a nonmagnetic pattern separating the recording tracks.

7. The magnetic recording apparatus according to claim 5, wherein the data zones comprise a soft underlayer and magnetic patterns made of a perpendicular magnetic recording layer formed on the soft underlayer.

8. The magnetic recording apparatus according to claim 6, wherein an innermost recording track is located at a radial position at most 5 mm away from a media center.

9. The magnetic recording apparatus according to claim 5, wherein the magnetic head comprises a read head including a giant magnetoresistive element.

10. The magnetic recording apparatus according to claim 5, wherein the magnetic head comprises a write head including a single pole.

* * * * *